Aug. 27, 1929.  W. J. HENDERSON  1,725,862
LIGHT AUTOMOTIVE TRACTOR FOR GENERAL FARM USE
Filed Aug. 24, 1925  2 Sheets-Sheet 2
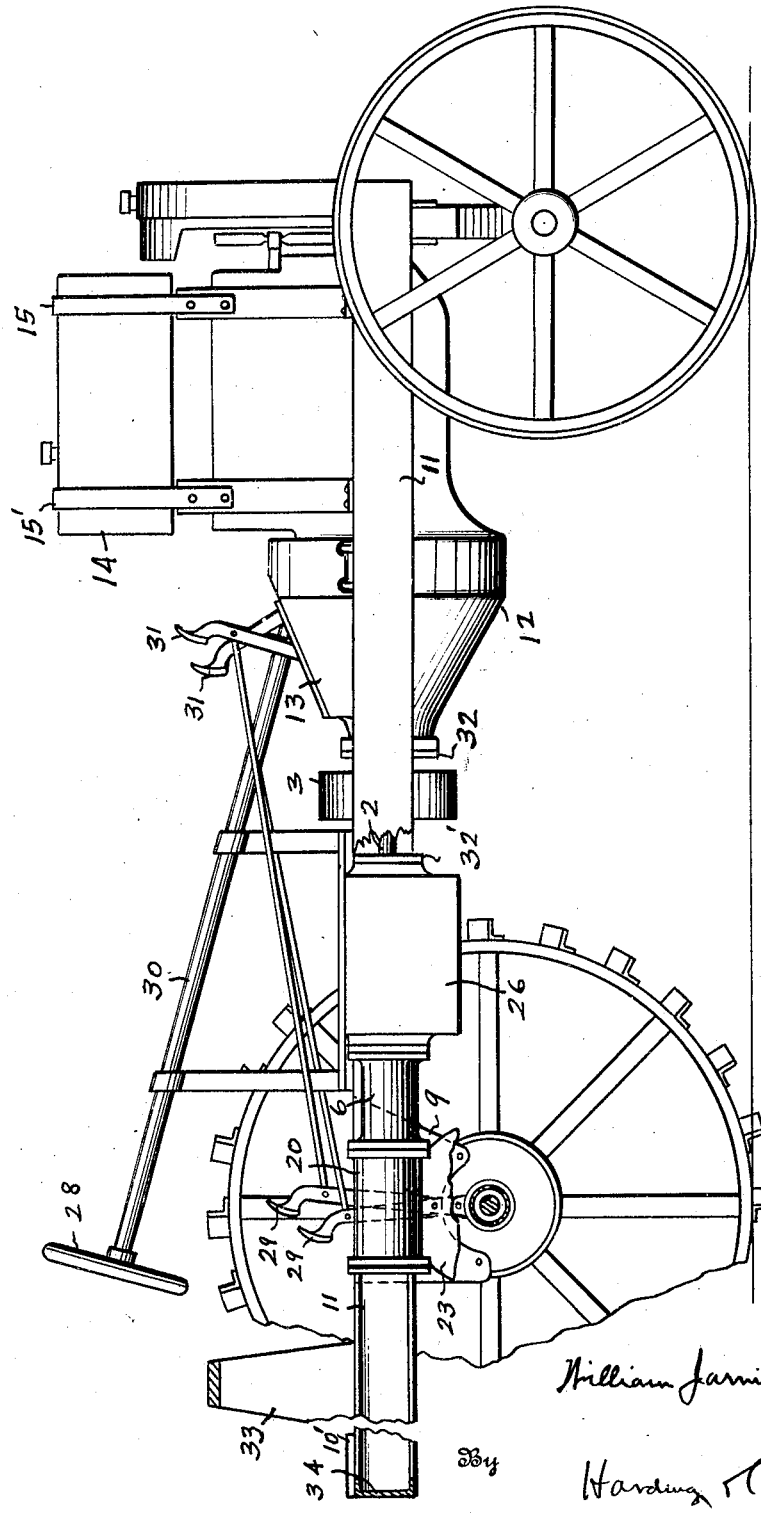

Patented Aug. 27, 1929.

1,725,862

UNITED STATES PATENT OFFICE.

WILLIAM JARVIS HENDERSON, OF HOUSTON, TEXAS.

LIGHT AUTOMOTIVE TRACTOR FOR GENERAL FARM USE.

Application filed August 24, 1925. Serial No. 52,033.

This invention relates to tractors.

The primary object of this invention resides in the provision of a light automotive tractor for general use on a farm, constructed from parts gathered from various sources including a Ford automobile, a Ford truck, and a gear-shift transmission of any suitable make or design, supplemented by parts and devices specially designed and constructed for this particular device, having a large variety of speed-shifts so that when the tractor is being used for pulling heavy objects a low speed gear may be used giving a slow speed and great power, and when being used to pull a light load along a highway a high speed gear may be used giving a greater speed with less power.

With this and other objects in view, this invention resides in certain novel features of construction and arrangements of elements and devices more specifically set forth in the specifications, illustrated in the accompanying drawings, and pointed out in the appended claims.

In the accompanying drawings—

Figure 2 shows a side elevation thereof, partly broken away.

Figure 1:
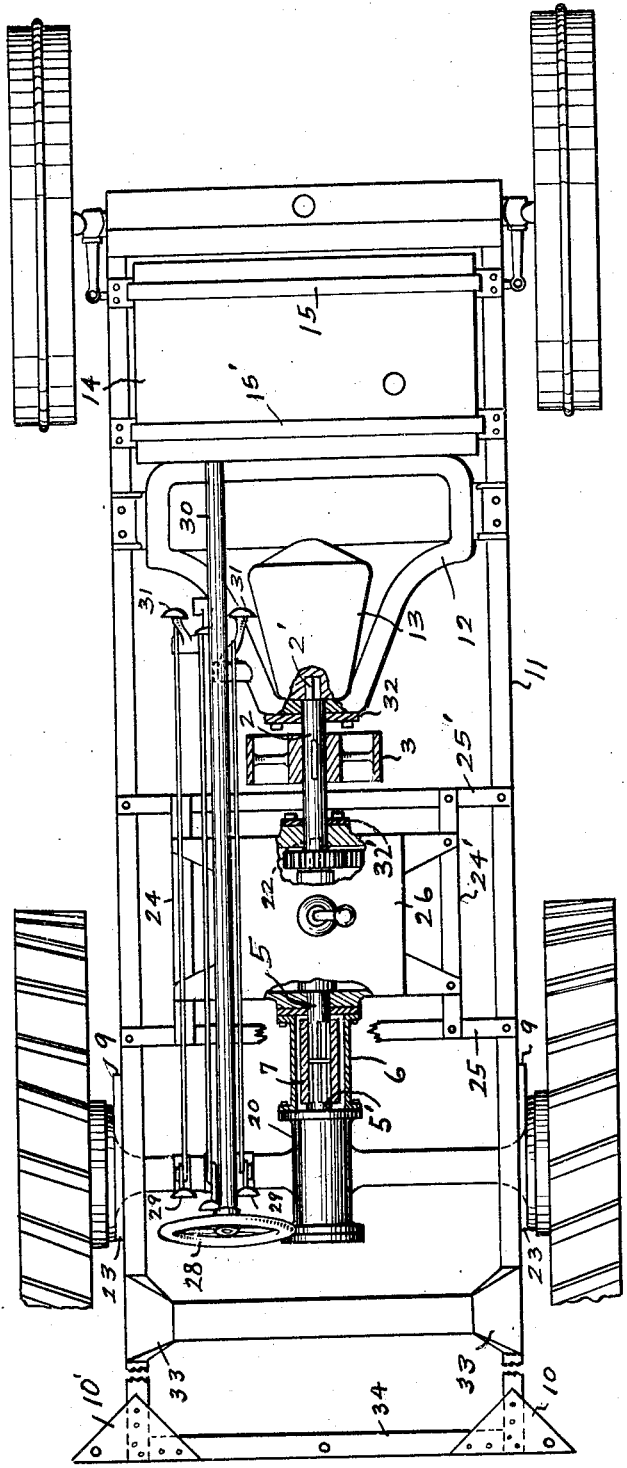
Figure 1 is a view of a tractor constructed in accordance with this invention, looking from above and shown partly in section.

In the present embodiment of this invention the numeral 13 designates the regular transmission device used in a Model T Ford engine manufactured by Ford Motor Company, encased in transmission housing 12.

Back of the housing of the Ford transmission 12 a sufficient distance to allow space for the detachable split-pulley 5, is a regularly constructed gear-shift transmission, of any suitable make or design, containing three forward speeds and one reverse speed, securely fastened to the frame 11 by means of iron bars 24 and 24', bolted to cross-bars 25 and 25', and held in alignment with the Ford transmission 13 and a regular worm-drive differential 20 now in use in a regularly constructed Ford truck.

The gear-shift transmission 26 is connected with the Ford transmission 13 by means of a round steel shaft 2 squared at the end 2' so as to insert in the Ford transmission at the place and in the same manner that the Ford universal joint connects with the Ford transmission in a regularly constructed Ford vehicle. The opposite end of the shaft 2 is enlarged and equipped with cogs in such a manner as to mesh into the gears of the transmission 26 and make connection between the two transmissions 13 and 26, and the center is hollowed to receive the round end of transmission shaft 5.

Attached to the steel shaft 2—2' between transmissions 13 and 26 is a detachable split-pulley 3 of any suitable size and make, for the purpose of supplying belt power when connected with a belt or chain.

The open ends of the housings of the two transmissions 13 and 26 are closed by means of steel dust caps 32 and 32' having holes in the center of each to allow passage to shaft 2.

The numeral 5 designates the regular transmission shaft used in any gear-shift transmission, one end being round and the opposite end being splined. The round end of the transmission shaft 5 is inserted into the pocket 22 shown and the splined end is connected to the splined end of a regular worm-drive differential 20 in common use in Ford trucks, by means of a splined sleeve 7 which passes over the end of the worm-drive 20 and the end of the transmission shaft 5, making a direct and rigid connection; and completing a direct connection between the engine and the differential.

The exposed opening between transmission 26 and differential 20 is closed by means of a steel housing 6, one end being bolted to the exposed end of the housing of transmission 26 and the opposite end is bolted to the exposed end of the differential housing.

The seat is formed by a seat board of any suitable material supported by means of braces 33 made of any material of sufficient strength and durability, fastened to frame 11 behind the rear a sufficient distance to allow the driver an unobstructed vision of plows pulled by the tractor, so that one man may operate both the tractor and the plow.

A second set of foot pedals 29 is hinged to the housing of the rear axle by means of steel bands passing around the housing, and extend upward to within easy reach of the driver's feet. Each of the pedals 29 is connected by means of a steel rod of sufficient strength and durability to the corresponding pedal 31 which operates the brake, low and high forward speeds and reverse speed of the regular Ford transmission. A hole is placed in the leg and near the center of each pedal, and one end of the connecting rod is bolted to the regular Ford pedals 31 and the opposite end is bolted to the corresponding pedal 29, in such a manner as to allow free movement of the pedals.

The steering wheel 28 is placed toward the rear of the tractor in a position to be easily reached by the driver from the seat of the tractor, and is connected with the regular steering device used on a Ford automobile by extending the length of the steering shaft 30 sufficient to make the connection. The gas control lever and spark control lever are placed in their regular position on the steering wheel, and the connection rod for each is extended the necessary length. The steering wheel is held in position by means of steel braces rising from the cross-bar 25'.

A short spring of the desired length is used to support the front end of the frame from the front axle, and the rear end is supported from the rear axle housing by means of steel plates 9 fastened securely to frame 11 and to the flanged portion of the rear axle housing 23. One of these plates is placed on each side of the frame and replaces the rear spring, holding the frame in rigid position. These plates are irregular in form, hollowed out at the bottom so as to pass above the housing.

The rear end of the frame 11 is held together by means of a cross-bar 34, and is braced by placing triangular steel plates 10 and 10' at each corner, securely fastened in position by bolts or rivets, as shown in Fig. 1. The protruding corner of each triangular plate contains a hole to allow connection with any vehicle to be pulled, and a similar hole for like purpose is placed in the center of the cross-bar 34.

The gas tank 14 is placed over the engine and replaces the hood, and is supported by means of steel braces securely fastened to frame 11 and arching upward over the engine, and is held in position by straps 15 and 15' passing over the tank and fastened to the supporting braces.

Any suitable wheels may be used, and the tractor may be constructed any desirable length or width, preferably of small dimensions so as to be adapted to farm use, and may be propelled by any suitable internal combustion engine, preferably the Model T engine manufactured by Ford Motor Company; and the frame, axles and steering device may be of any suitable make or design, preferably that used in a regularly constructed Ford automobile with the dimensions altered accordingly.

With this invention fully set forth, it is manifest a light automotive tractor for general farm use of great utility is provided.

I do not limit myself to any specific construction as described in this specification for the purpose of giving examples or illustrations of my invention, for it is obvious that various changes in the details may be resorted to without departing from the spirit and scope of the invention, which is set forth in the following claims:

I claim:

1. In a motor vehicle the combination with a main transmission provided with a drive shaft having a polygonal socket, of an auxiliary transmission, an exposed connecting drive shaft, one end of which conforms to the shape of and fits in said socket and whose other end is formed with a spur gear adapted to intermesh with the gears of said auxiliary sectional transmission, the geared end of said shaft having an axial bearing, a transmission shaft forming part of said auxiliary transmission and one end of which works in said bearing and whose other end has a driving connection with the rear axle differential of the vehicle and a sleeve splined on the adjacent ends of the sections of said transmission shaft.

2. In a motor vehicle the combination with a main transmission including a drive shaft having a polygonal socket, of an auxiliary transmission, an exposed connecting drive shaft, one end of which conforms to the shape of and fits in said socket and whose other end is formed with a spur gear adapted to intermesh with the gears of said auxiliary transmission, the geared end of said shaft having an axial bearing, a transmission shaft forming part of said auxiliary transmission and one end of which works in said bearing and whose other end has a driving connection with the rear axle differential of the vehicle, said transmission shaft being formed of sections, a sleeve splined onto adjacent ends of said sections and a tubular housing surrounding said transmission shaft and whose respective ends are fastened to the adjacent auxiliary transmission housing and the differential housing, respectively.

3. In a motor vehicle the combination with a main transmission including a drive shaft having a polygonal socket, of an auxiliary transmission, a connecting drive shaft, one end of which conforms to the shape of and fits in said socket and whose other end is formed with a spur gear adapted to intermesh with the gears of said auxiliary transmission, the geared end of said shaft having an axial bearing, a transmission shaft formed of sections and forming part of said auxiliary transmission and one end of which works in said bearing and whose other end has a driving connection with the rear axle differential of the vehicle, a sleeve splined on adjacent ends of said sections, said transmissions being held in fixed relation to each other and to said differential.

4. In a motor vehicle the combination with a main transmission including a drive shaft having a polygonal socket, of an auxiliary transmission, an exposed connecting drive shaft, one end of which conforms to the shape of and fits in said socket and whose other end is formed with a spur gear adapted to intermesh with the gears of said auxiliary transmission, the geared end of said shaft having an axial bearing, a transmission shaft formed of sections and forming a part of said auxiliary transmission and one end of which works in said bearing and whose other end has a driving connection with the rear axle differential of the vehicle, means operatively connecting said sections, a housing around said connecting means, said transmissions being spaced apart to provide space for the reception of a driving pulley on said exposed connecting drive shaft.

5. In a motor vehicle, the combination with a main transmission including a driving member having a polygonal socket, of an auxiliary transmission including transmission gears, a drive shaft, one end of which is shaped to conform to and is fitted within said socket and whose other end is formed with a gear in mesh with and adapted to drive one of said auxiliary transmission gears, the geared end of said shaft formed of sections having a bearing, a transmission shaft incorporated into said auxiliary transmission, one end of which rotates in said bearing and whose other end is in operative connection with the rear axle differential of said vehicle, an enclosed sleeve splined onto adjacent ends of said sections, and a supporting frame maintaining said transmissions in fixed relation to each other and to said differential.

6. In a motor vehicle the combination with a main transmission including a drive shaft, of an auxiliary transmission, an exposed connecting drive shaft, said drive shafts having adjacent ends which are clutched together, a spur gear carried by the other end of said connecting drive shaft adapted to intermesh with the gears of said auxiliary transmission, a transmission shaft formed of sections and forming part of said auxiliary transmission, one end of said transmission shaft being adjacent the geared end of said connecting drive shaft and said last mentioned ends being provided one with a bearing in which the other works and the other end of said transmission shaft having a driving connection with the rear axle differential of the vehicle, means operatively connecting said sections, a housing around said connecting means, said transmission being spaced apart to provide space for the reception of a driving means on said exposed connecting drive shaft.

In testimony whereof I affix my signature hereto.

W. JARVIS HENDERSON.